April 21, 1970     K. B. THAYER ET AL     3,507,251
COATING APPARATUS

Filed March 28, 1968     4 Sheets-Sheet 1

Keith B. Thayer
Willis E. Peterson
INVENTORS

BY
ATTORNEY

April 21, 1970   K. B. THAYER ET AL   3,507,251
COATING APPARATUS

Filed March 28, 1968   4 Sheets-Sheet 4

Keith B. Thayer
Willis E. Peterson
INVENTORS

BY
ATTORNEY

United States Patent Office 3,507,251
Patented Apr. 21, 1970

3,507,251
COATING APPARATUS
Keith B. Thayer and Willis E. Peterson, Houston, Tex., assignors to Schlumberger Technology Corporation, New York, N.Y., a corporation of Texas
Filed Mar. 28, 1968, Ser. No. 716,751
Int. Cl. B05c 3/04
U.S. Cl. 118—425    5 Claims

ABSTRACT OF THE DISCLOSURE

Apparatus for selectively immersing articles to be coated into a coating material and, while they are immersed, agitating the articles to deposit a uniform protective coating thereon. More particularly, the apparatus disclosed herein includes a vertically-movable support that is adapted to receive heated articles and controllably lower these articles from an elevated position into a fluidized bed of a pulverulent coating composition. The apparatus further includes selectively-operable means for vertically reciprocating as well as for laterally oscillating the immersed artices before they are raised from the fluidized bed.

---

It is, of course, quite common to coat metal articles by first heating the articles to an elevated temperature and then immersing the heated articles into a fluidized bed of a selected pulverulent coating composition having a sintering temperature lower than the temperature of the articles. As the fluidized particles approach or contact the heated articles, some of these particles absorb heat from the articles and are melted to form a continuous fused coating on the substrate surfaces. Where the nature of the coating composition so requires, the freshly-coated articles are subsequently reheated to complete the fusion process and leave an effective protective coating on the substrate surfaces.

There are, of course, many well-known techniques for preparing the surfaces of metal articles for accepting such coatings as well as for providing effective fluidized beds of various coating compositions. Although the particular techniques may vary somewhat depending upon which composition is to be used, those skilled in te art are fully cognizant of the various ramifications involved to achieve a desired result with a given coating composition.

Irrespective of the particular coating composition being used, it is generally recognized that the heated articles must usually be agitated while they are immersed in the fluidized bed to assure uniformly-distributed coatings. This, of course, poses no particular problem where only little articles or small quantities are involved. The problem becomes more significant, however, when large-scale coating operations are considered and, particularly so, where the articles to be coated are of considerable size. For example, where fairly long articles such as pipes, rods, irregularly-shaped structural members, and the like, are to be powder-coated, it is usually found more efficient to transport such members in a vertical position on a conveyor system through most, if not all, of the coating plant to minimize the floor space required. Although transporting such members in a vertical position may be of benefit in other operations of the coating plant, no fully-effective arrangement has yet been provided for immersing these heated members in a fluidized bed and imparting agitative motion to the members as they are being coated.

Accordingly, it is an object of the present invention to provide new and improved apparatus for receiving vertically-supported articles and momentarily immersing these articles in a coating composition while imparting a positive agitative motion to these immersed articles to insure that a uniform coating will be deposited on each article.

This and other objects of the present invention are attained by arranging an article-supporting member for movement between an elevated position in alignment with an article-transporting system and a lower position therebelow overlying a fluidized bed of a coating composition. Selectively-operable agitating means are cooperatively arranged for reciprocating the article-supporting member along a selected axis as well as oscillating the member in relation to this selected axis while it is in its lower position so that an article carried thereon will receive a uniform coating while in the fluidized bed.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

Figure 1:
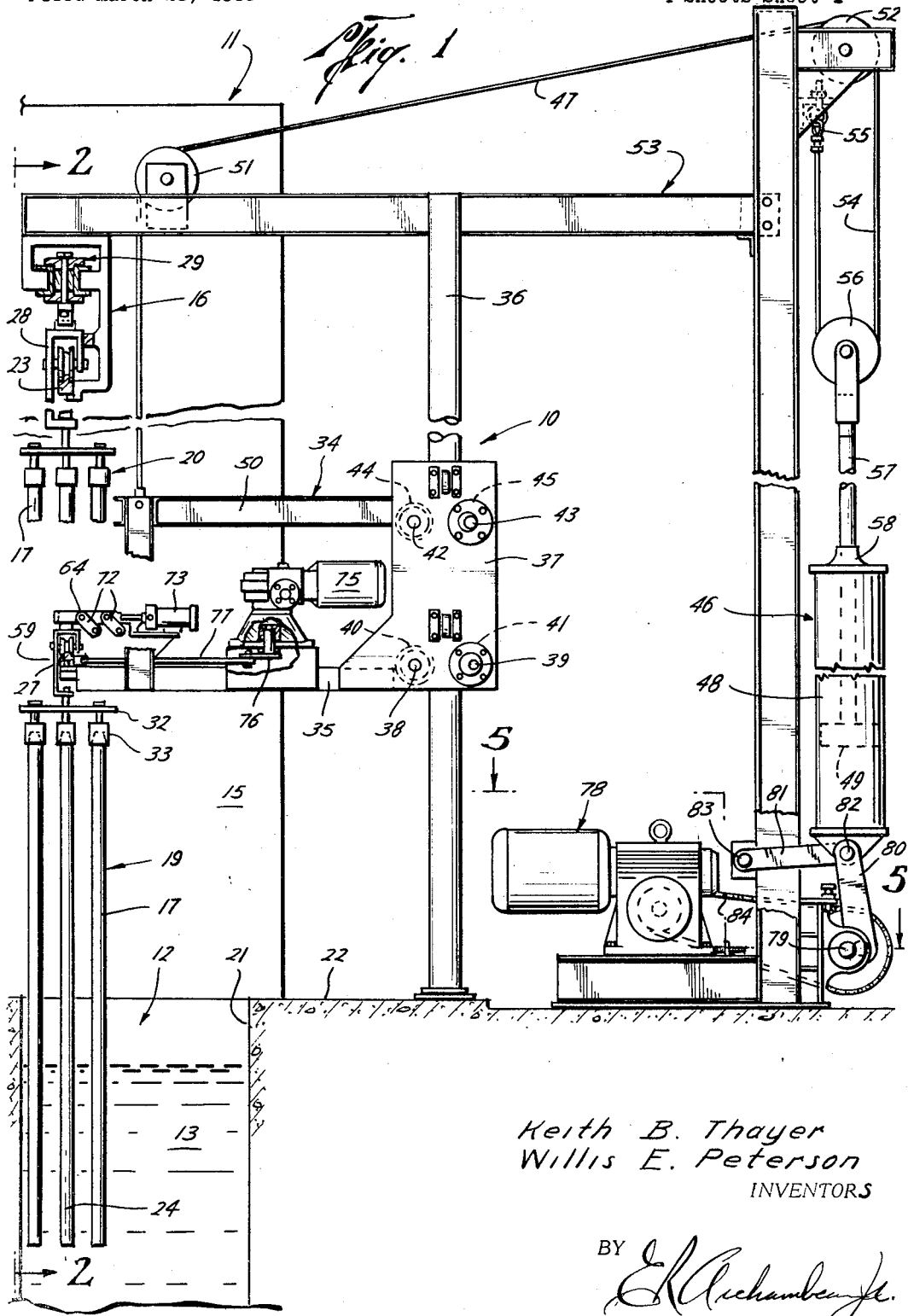
FIGURE 1 is an elevational side view of a preferred embodiment of apparatus arranged in accordance with the principles of the present invention.
Figure 2:
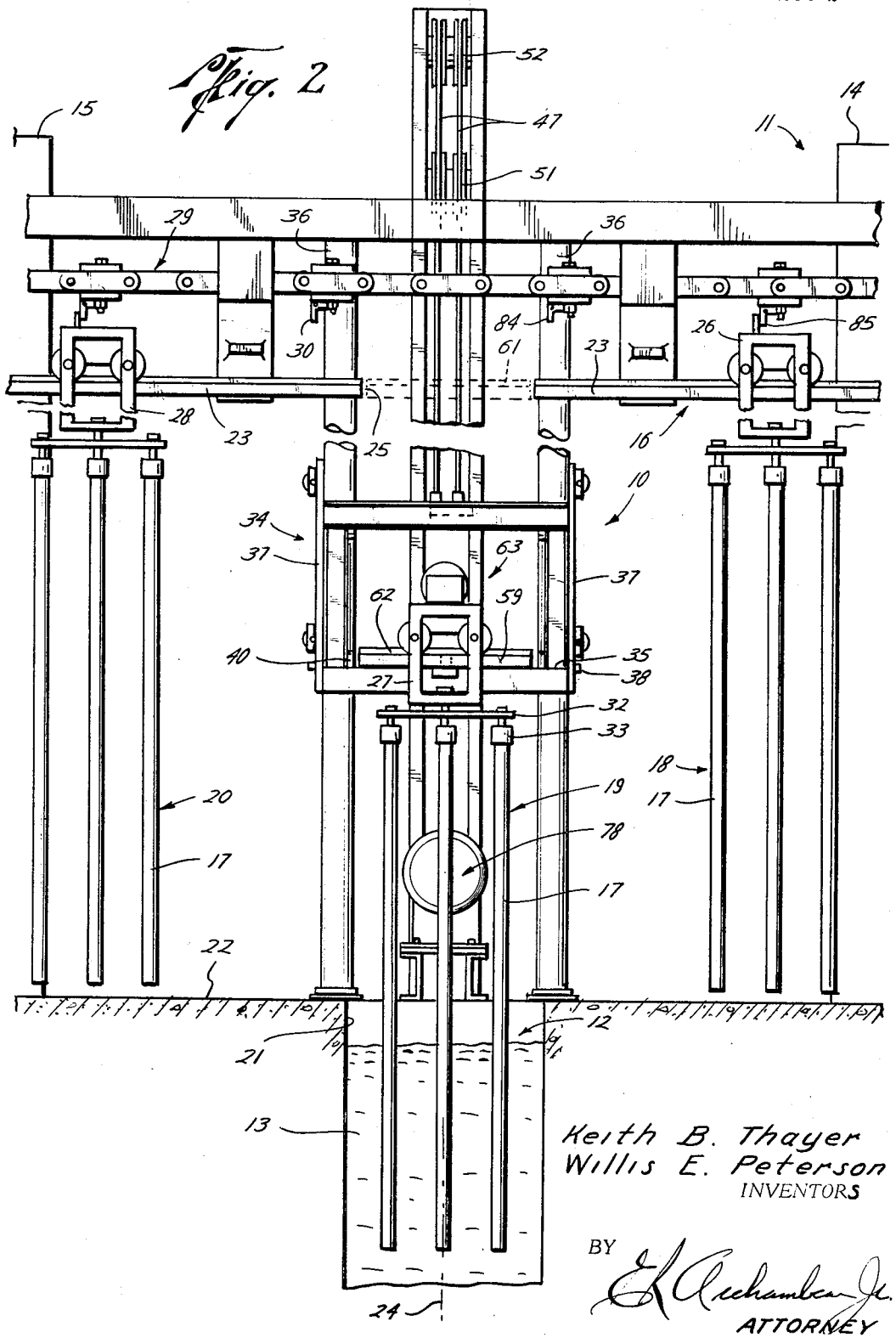
FIGURE 2 is a partially cross-sectioned view of the front elevation of the apparatus of FIGURE 1.
Figure 3:
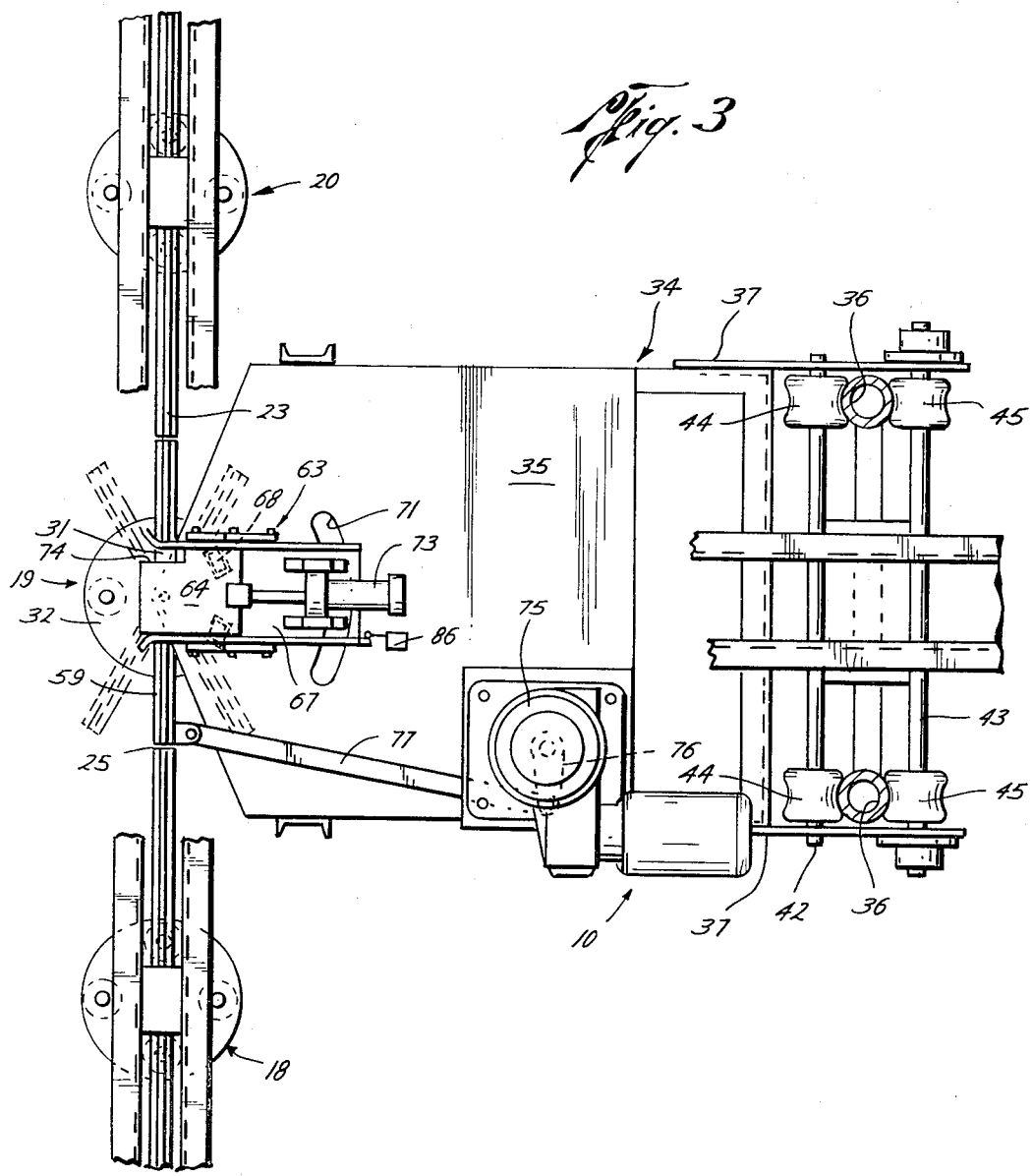
FIGURE 3 is an enlarged plan view, partially in cross-section, of a portion of the apparatus depicted in FIGURE 1.

Turning now to FIGURES 1-3, an article-handling machine 10 arranged in accordance with the present invention is depicted in an exemplary coating plant 11 having an upright fluidized bed 12 of a selected pulverulent coating composition 13 and typical pre-heating and post-heating ovens 14 and 15. To transport articles from one position to another, the coating plant 11 further includes a conveyor system 16 that is operatively arranged between the machine 10 and the ovens 14 and 15. In general, the article-handling machine 10 of the present invention is adapted to successively receive heated articles that are transported thereto by the conveyor system 16 and briefly immerse and agitate these articles in the fluidized bed 12 for uniformly applying a selected coating thereto. After the articles have been in the fluidized bed 12 for a predetermined time interval, the article-handling machine 10 is adapted to elevate the freshly-coated articles for transportation away from the machine by the conveyor system 16.

Although a wide variety of articles can be effectively coated in the depicted coating plant 11, it will be assumed for purposes of describing the present invention that a plurality of elongated members, such as joints of pipe 17 or the like, are to be coated. Accordingly, to facilitate their handling, these pipes 17 are divided into conveniently-sized groups, as at 18–20, that are dependently suspended in a vertical position at selected intervals along the conveyor system 16 for progressive movement through the depicted coating plant 11. It will be assumed in the forthcoming description that the group of pipes 18 are emerging from the pre-heating oven 14 and is moving toward the article-handling machine 10 which is presently carrying the previously-heated group of pipes 19. The last group of pipes 20 has already been coated and is being moved along the conveyor system 16 into the post-heating oven 15.

Inasmuch as the arrangement of the fluidized bed 12 can be typical and its particular constructional details are only incidental to an understanding of the present invention by those skilled in the art, only the upper portion of an open-topped vessel 21 containing the pulverulent coating composition 13 is shown in the drawings. For convenience, the vessel 21 is submounted below the surface of a working platform or floor 22. It will be appreciated, of course, that the dimensions of the vessel 21 will be governed by the length and lateral dimensions of the pipes 17 or other articles that are intended to be coated therein.

As is typical, the vessel 21 has a porous partition (not shown) near its lower end horizontally dividing the vessel. This partition, which is pervious to the gas used to expand the bed but impervious to the coating particles 13, preferably takes the form of a porous ceramic plate. A sufficient quantity of the pulverulent coating material 13 is placed on the upper surface of the porous partition so that the pipes 17 to be coated in the bed 12 can be immersed therein as required. Thus, by introducing an adequate supply of a suitable pressured gas, such as air or nitrogen, into the lower portion of the vessel 21 below the porous partition, the pulverulent coating composition 13 will expand upwardly in the well-known manner until the upper surface of the bed rises to an elevated equilibrium level within the vessel.

In one manner of aranging the conveyor system 16, a horizontal section of a typical conveyor track 23 is suitably suspended above the floor 22 and preferably oriented to approach an intersection with the vertical axis 24 of the vessel 21 at a height that is sufficient for the lower ends of the depending pipes 17 to clear the top of the vessel. For reasons that will subsequently become apparent, the fixed conveyor track 23 is interrupted, as at 25 (FIGURE 2), so as to leave a relatively short gap therein straddling the point where the track would otherwise intersect the vessel axis 24. A plurality of article-transporting carriages or so-called "trolleys," as at 26–28, are arranged at selected intervals along the conveyor track 23 for progressive movement thereon from the pre-heating oven 14 to the post-heating oven 15. The trolleys 26–28 can, of course, be arranged for movement by either gravitational or manual forces. It is preferred, however, to selectively drive the trolleys 26–28 along the track 23 by means such as a typical powered chain-drive assembly 29 arranged for controlled longitudinal movement just above and parallel to the conveyor track and carrying a plurality of serially-spaced depending lugs, as at 30, that are adapted for cooperative engagement with upright abutments, as at 31, on the trolleys. In this manner, as the chain-drive assembly 29 is operated, the trolleys 26–28 will be progressively driven along the conveyor track 23 so long as the moving depending lugs 30 are respectively engaged with the abutments 31.

It will be realized, of course, that any one of a number of arrangements can be employed to dependently suspend the pipes 17 from the trolleys 26–28. It is preferred, however, to dependently couple a plate, as at 32, to each of the trolleys 26–28. A convenient number of pipe hangers, as at 33, are then dependently mounted at spaced intervals around the perimeter of each of the plates 32 so that once the upper ends of the pipes 17 are coupled thereto, they will be closely grouped (as at 18–20) for easy transportation along the conveyor track 23 but will still be sufficiently spaced from one another to allow each group to be thoroughly coated upon their immersion in the fluidized bed 12 by the machine 10.

Since the vessel 21 is vertical, access to the fluidized bed 12 is best gained by axially moving the pipes 17 to be coated therein into and out of the bed along generally vertical paths that preferably parallel the longitudinal axis 24 of the vessel 21. To accomplish these movements, the article-handling machine 10 of the present invention is mounted on the floor 22 immediately to the rear of the fluidized bed 12. As best seen in FIGURES 1–3, the article-handling machine 10 includes a movable carriage 34 that overhangs the vessel 21 and is adapted for vertical travel between an elevated position in general alignment with the conveyor system 16 and a lower position just above the open top of the vessel.

In its preferred form, the carriage 34 is comprised of a generally horizontal base 35 that is slidably coupled along its rearward edge to a pair of spaced uprights or paralleled vertical standards 36 mounted on the floor 22 a short distance to the rear of the upper end of the vessel 21. The base 35 is extended outwardly from the standards 36 and over the vessel 21 a sufficient distance to bring the forward edge of the base to just about the vertical axis 24. In one manner of slidably coupling the carriage to the standards 36, upright plates 37 are respectively secured along each side of the base 35 and extended upwardly just outside of the standards to carry two horizontal axles 38 and 39 respectively spanning the plates just in front of and to the rear of the standards. Rollers 40 and 41 are respectively journalled near each end of the axles 38 and 39 and adapted for rolling along the forward and rearward faces of the standard 36. To steady the carriage 34 as it moves up and down the standards 36, a second pair of horizontal axles 42 and 43 are spaced above the axles 38 and 39 and respectively carry rollers 44 and 45 at each end thereof that are also adapted for rolling movement along the forward and rearward faces of the standards 36. It will be appreciated, therefore, that the carriage 34 is readily movable in a vertical direction along the standards 36 but is effectively restrained from lateral movement as well as from tilting out of the horizontal position illustrated.

To translate the carriage 34 vertically along the standards 36, selectively-operable driving means are provided such as a typical hydraulic or pneumatic actuator 46 that is operatively mounted on the machine 10 and connected, as by one or more paralleled cables 47, to the carriage for moving it as required between its upper and lower positions. In the preferred embodiment of the article-handling machine 10, the actuator 46 includes a piston cylinder 48 that is supported on the machine in a generally upright position and has a piston member 49 slidably disposed therein for reciprocating movement in response to operation of a typical hydraulic or pneumatic control system (not shown). The cables 47 are secured at their forward ends to a horizontal upper frame member 50 of the carriage 34 and returned over suitable sheaves 51 and 52 mounted at the front and rear of an appropriate structural frame 53 extending over the carriage.

After passing over the rearward sheave 52, the cables 47 are formed into depending loops 54 and their rearward ends are then secured, as at 55, to the frame 53. A third sheave 56 that is operatively carried within the bights of the cable loops 54 is journalled from the upper end of a piston rod 57 that is slidably received by a typical packing gland 58 on the upper end of the cylinder 48 and connected to the piston 49 therein. It will be appreciated, therefore, that when the piston 49 is retracted into the cylinder 48, the resulting downward travel of the idler sheave 56 will correspondingly lengthen the cable loops 54 and draw the forward portion of the cables 47 rearwardly across the sheaves 51 and 52 to elevate the carriage 34. On the other hand, when the piston 49 is moved upwardly in relation to the cylinder 48, as the cable loops 54 are shortened, the forward portions of the cables 47 will be payed out over the sheaves 51 and 52 to lower the carriage 34 a corresponding distance. Accordingly, it will be appreciated that the cable actuator 46 is selectively operable to move the carriage 34 between an elevated position well above the fluidized bed 12 and a lowered position immediately above the open top of the vessel 21.

Figure 4:
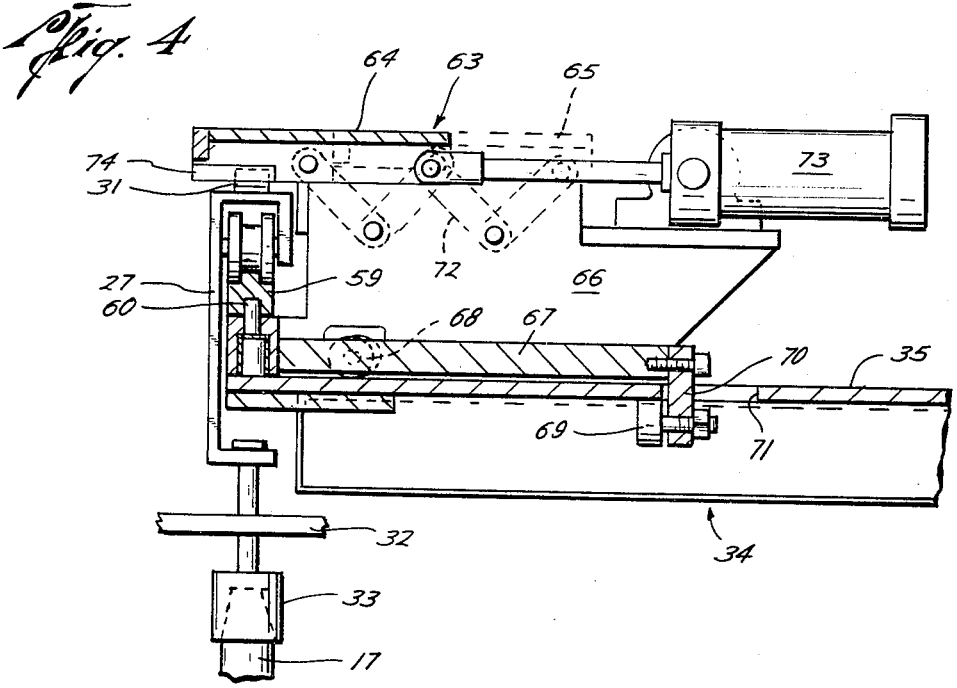
FIGURE 4 is a partial view view of the article-handling machine shown in FIGURES 1–3 showing particular details thereof.
Figure 5:
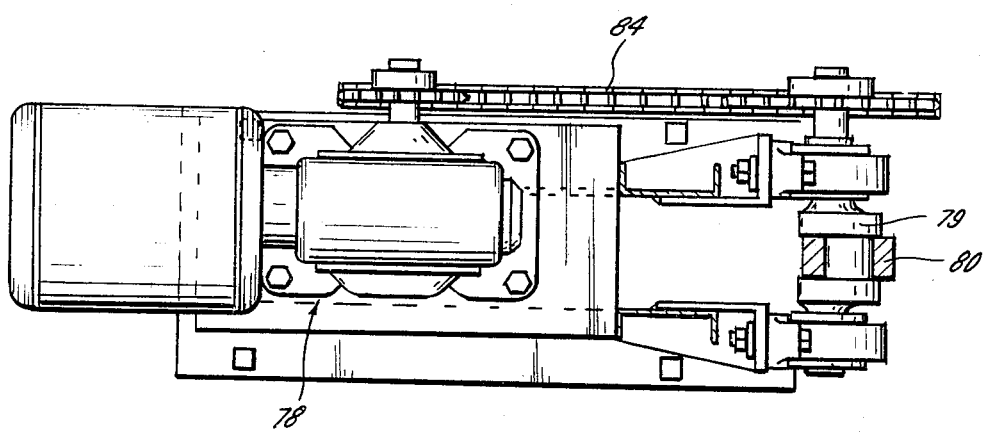
FIGURE 5 is an enlarged cross-sectional view taken along the lines 5—5 in FIGURE 1 and illustrates further details of the article-handling machine of the present invention.

To successively receive articles moving along the conveyor system 16, the article-handling machine 10 includes a section of track 59 that has a cross-section similar or identical to the conveyor track 23 and a length approximately equal to the length of the gap 25 in the conveyor track. As best seen in FIGURE 4, the track section 59 is pivotally mounted on the forward edge of the carriage base 35, as by an upright pivot 60, for pivotal movement in a horizontal plane about a vertical axis which, in the preferred embodiment, is coincidental with the vertical axis 24 of the vessel 21.

It will be appreciated, therefore, from FIGURE 2 that the article-handling machine 10 is operatively arranged so that when the carriage 34 is fully elevated, the track section 59 (as shown by the phantom lines at 61) is longitudinally aligned with the conveyor track 23 for spanning the gap 25 therein and, by means that will subsequently be explained, is releasably retained in this gap-spanning position so long as the carriage is in its fully-elevated position. Thus, when a bundle of the pipes 17, as at 19, is transported along the conveyor track 23, its associated trolley 27 will be received by the short track section 59 as the pipe bundle moves into position over the fluidized bed 12. Then, by selectively operating the cable-actuator 46 to lower the carriage 34, the pipe bundle 19 will be lowered into the fluidized bed 12.

The mid-portion of the upper face of the track section 59 is slightly recessed, as at 62, so that as a trolley, such as the trolley 27 for example, rolls onto the track section, the trolley will not tend to continue rolling further. Selectively-operable clamping means 63 are also arranged to secure this trolley, as at 27, against movement on the track section 59 so long as the carriage 34 is not in its fully-elevated position. In the preferred form of the article-handling machine 10, the clamping means 63 include a flat plate 64 while, as best seen in FIGURE 4, is movable along a generally horizontal, slightly arcuate path between a position (as shown in phantom at 65) to the rear of the track section 59 and a forward position as illustrated overlying the track section where the flat plate will tightly clamp or at least narrowly confine a trolley, as at 27, between the lower surface of the flat plate and the track section.

To carry the flat plate 64, a suitably-arranged stand 66 is mounted on a horizontal plate 67 that is secured along its front edge to the rear of the track section 59 and supported on the upper surface of the carriage base 35 by appropriately-positioned rollers 68 for pivotal movement about the pivot 60. Additional rollers 69 are preferably engaged with the lower surface of the carriage base 35 and connected to a depending flange 70 extending along the rear edge of the pivoting plate 67 and projecting through an elongated, generally arcuate opening 71 formed in the carriage base. The clamping plate 64 is pivotally mounted over the stand 66 by one or more pairs of pivoted links 72 for selective movement by suitable driving means such as a solenoid or a hydraulic or pneumatic actuator 73 that is carried on the rear of the stand. As a further precaution against inadvertent rolling of a trolley, as at 27, on the track section 59, a notch 74 is formed in the forward edge of the clamping plate 64 and adapted to receive the upstanding abutment 31 on the trolley. Thus, once the actuator 73 is operated to move the clamping plate 64 over the trolley 27, the plate will prevent the trolley from moving upwardly off of the track section 59. Similarly, once the clamping plate 64 is in position, the upstanding abutment 31 on the trolley 27 will be confined in the notch 74 to prevent lateral movement of the trolley in either direction along the short track section 59 should the trolley not be tightly clamped thereon.

As previously described, it is highly advantageous to agitate a heated article while it is immersed in a fluidized bed. Accordingly, it is another function of the article-handling machine 10 to impart an oscillatory movement to articles supported thereon while these articles are immersed in the fluidized bed 12. Thus, as best seen in FIGURES 1 and 3, in the preferred embodiment of the article-handling machine 10, the short track section 59 is selectively oscillated about its vertical pivot 60 by coupling one end of the track section to a horizontally-reciprocating driver such as a rotating powered gear-drive 75 mounted on the base 35 and operatively connected to the track section by means such as a crank shaft 76 and connecting rod 77. In the particular embodiment of the machine 10 illustrated, the crank shaft 76 is arranged to oscillate the track section 59 through an arc of preferably 30 (i.e., 15° on each side of the normal at-rest position of the track section) and preferably at a crank speed of 17.5 r.p.m. The values are, of course, only exemplary of the depicted machine 10 and are not considered as limiting the scope of the present invention.

It will be realized, of course, that since the clamping means 63 are secured to the track section 59, this complete assembly will be correspondingly rocked about the pivot 60 in relation to the carriage base 35 as the track section is oscillated. It should be understood, however, that although it is preferred for the clamping means 63 to oscillate with the track section 59 as depicted, the clamping means could just as well be arranged to be supported on the carriage base 35 and remain steady as the trolley 27 and track section are oscillating.

To secure still further agitation of articles immersed in the fluidized bed 12, means are also provided for selectively reciprocating the carriage 34 vertically. In the preferred form of the article-handling machine 10, this is accomplished as best seen in FIGURES 1, 2 and 3 by coupling the piston cylinder 48 to a selectively-operable vertically-reciprocating driver such as a motor-drive 78 that rotates a crank shaft 79 which is coupled to the piston cylinder by a connecting rod 80. To limit the movement of the piston cylinder 48 to a substantially vertical path, a link 81 is connected between the pivot connection 82 joining the upper end of the connecting rod 80 to the lower end of the cylinder and a fixed pivot connection 83 on the structure 53. Thus, the lower end of the cylinder 48 is guided along an arcuate but substantially vertical path that is determined by the link 81 as the piston cylinder is reciprocated by the connecting rod 80 and its associated crank shaft 79. Here again, to give a typical illustration of the invention without limiting its scope, the motor-drive 78 and driving-chain 84 used with the illustrated article-handling machine 10 are adapted to drive the crank shaft 79 at a speed of 56 r.p.m. and move the cylinder 48 through a total vertical stroke of 2½ inches (i.e., 1¼ inches above and below the longitudinal axis of the crank shaft 79).

It will be recognized, of course, that the reciprocation of the cable-actuator 46 as a whole is entirely independent of the movement of the piston 49 in relation to the cylinder 48. Thus, the cable-actuator 46 can be reciprocated by the crank shaft 79 in any position of the piston 49 and irrespective of whether the carriage 34 is in motion or is stationary. In any event, therefore, once the motor 78 is started, the cable-actuator 46 will be reciprocated by way of the cables 47 to produce a corresponding vertical reciprocation of the carriage 34.

Accordingly, it will be appreciated that the agitating means of the machine 10 are selectively operable to shake articles, such as the pipes 17, suspended thereon in one or two selected manners by imparting a vertical reciprocation as well as a lateral oscillation thereto. In addition, the article-handling machine 10 is selectively operable to raise and lower articles into and out of the fluidized bed 12.

It will be recognized, of course, that the degree of sophistication of the controls used for the article-handling machine 10 as well as for the other portions of the coating plant 11 can range the full gambit between fully-manual to fully-automatic devices. Thus, to avoid subordinating the unique operation of the article-handling machine 10 by an extension description of an elaborate control system, it is believed best to describe the operation of the machine as such in relation to the other portions of the coating plant 11 in conjunction with various operational parameters and merely give examples of typical control devices that may be employed in the overall system.

In a typical application of the coating plant 11, the surfaces of a number of pipes 17 that are to be coated are properly cleaned and conditioned to receive a selected coating that will be tightly bonded thereon. Such surface preparations are, of course, well-known in the art and need no further elaboration. Then, either before or after this surface preparation, the pipes 17 are coupled to their respective hangers 33 on the hanger plates 32 for dependent suspension from the conveyor system 16 for transportation thereby through the coating plant 11.

Once the pipes 17 are grouped, as at 18–20, on their respective trolleys 26–28, they are successively moved into the pre-heating oven 14 at appropriate intervals. Once in the oven 14, each of the groups 18–20 are retained in the heated oven for a sufficient period of time that will allow the pipes 17 to reach a desired elevated temperature. The particular temperature that the pipes 17 must attain will, of course, be dependent upon the particular coating composition 13 that is being used for coating the pipes. In general, however, the temperature to which the pipes 17 will be heated will be significantly greater than the sintering or melting temperature of the coating composition 13 but still less than any extreme temperatures that would tend to degrade the composition. It will be realized, of course, that the groups of pipes 18–20 may be either halted in the oven 14 or progressively moved therethrough at a rate calculated to enable the pipes 17 to be adequately heated.

In any event, as a heated group of pipes, as at 19, emerge from the pre-heating oven 14, their associated trolley 27 will be carried onto the short track section 59 which is, at that time, in the at-rest position shown at 61 spanning the gap 25 in the conveyor track 23. Once the trolley 27 is on the track section 59, the article-handling machine 10 is operated to begin lowering the grouped pipes 19 and actuating the clamping means 63 to secure the trolley. It is, of course, preferred that the clamping plate 64 be over the trolley 27 at least before the grouped pipes 19 have been lowered very far by the article-handling machine 10 to assure that the trolley is not inadvertently dislodged from the short track section 59. Thus, in one manner of controlling the article-handling machine 10, as the cable-actuator 46 is operated to begin the descent of the carriage 34, a suitable interlock control (not shown) is provided to energize the clamping-plate actuator 73 and maintain the clamping plate 64 in its forward position until the carriage is at least nearing its elevated position again.

When the group of pipes 19 are immersed in the fluidized coating particles 13, either or, preferably, both of the agitating drivers 75 and 78 are started. These drivers 75 and 78 can, of course, be started either simultaneously or in some predetermined sequence at selected intervals to impart a selected shaking or agitative movement to each pipe 17. In the preferred form of the present invention, a pre-programmed control system (not shown) is arranged for initiation each time a trolley, as at 27, moves onto the short track section 59. As a pressured fluid is being admitted at a regulated rate to the cable-actuator 46, the clamping-plate actuator 73 is energized to secure the trolley 27 before the carriage 34 has moved downwardly more than a few inches. Then, the agitating drivers 75 and 78 are started as desired and are operated until the pressured fluid has been sufficiently exhausted from the cylinder 48 for the carriage 34 to start moving back to its elevated position.

Those skilled in the art will, of course, realize that the total time of immersion as well as the heat capacity of an article being coated will be the most significant factors governing the thickness of coating on that article. Thus, since it typically requires only a brief time for immersion of an article, the abovementioned programmed timing system is appropriately arranged to begin raising the carriage 34 only a short time after it has reached its lower limit. Before the carriage 34 returns toward its elevated position, the agitating drivers 75 and 78 are halted; and the clamping-plate actuator 73 is subsequently operated to move the clamping-plate 64 to its rearward position shown at 65 in FIGURE 4. Thus, once the short track section 59 is again spanning the gap 25 in the conveyor track 23, the abutment 31 on the trolley 27 is engaged by an unoccupied depending lug, as at 84, on the chain-drive assembly 29 to move the trolley 27 on toward the oven 15 as the next trolley 28 is brought onto the short track section 59 by another lug, as at 85. It will be appreciated, therefore, that the spacing of adjacent chain lugs, as at 30, 84 and 85, and the speed of the chain-drive assembly 29 must be coordinated with the time required for the machine 10 to perform a complete cycle so that the short track section 59 will always be spanning the gap 25 when a trolley is moved into position thereon. This can, of course, be accomplished either by suitable control devices or by simply observing the progress of each group of the pipes 17 and manually controlling the chain-drive assembly 29 and cable-actuator 46 as required. Similarly, the agitating drivers 75 and 78 as well as the clamping-plate actuator 73 can be operated either manually or automatically as preferred.

To be certain that the track section 59 is halted in alignment with the conveyor track 23, a position-responsive switch 86 is preferably mounted for engagement by the plates 67 when it is centered on the base 35. This switch 86 is connected to the motor 75 and control circuits to allow the motor 75 to stop only when the track section 59 is aligned and in its "at-rest" position.

Irrespective of how the coating plant 11 is controlled, it will be appreciated that the article-handling machine 10 of the present invention is particularly adapted to efficiently immerse heated articles into a fluidized bed as at 12. Since the machine 10 is arranged to uniquely handle even particularly large vertically-suspended articles, such as the pipes 17 and the like, it will be realized that a large number of such articles can be quickly handled in a minimum amount of floor space. Moreover, the new and improved article-handling machine 10 requires no elaborate conveyor system and can be readily incorporated with existing conveyor systems. Furthermore, by being capable of selectively imparting one or two shaking movements to heated articles immersed in a fluidized coating material, the article-handling machine 10 of the present invention will assure that these articles are uniformly coated. Accordingly, it is readily apparent that the article-handling machine 10 can be efficiently employed in great number of situations for powder-coating of articles such as the pipes 17 that could not heretofore be uniformly coated in a reliable but economical manner.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Apparatus adapted for coating heat-conductive articles while heated to an elevated temperature and comprising: fluidized-bed means including a pulverulent coating composition contained in a vessel adapted for passage of heated articles along a generally-vertical path into and out of said coating composition; a generally-vertical upright adjacent to said vessel; a base movably coupled to said upright; means operable for alternately moving said base upwardly and downwardly along said upright between an elevated position and a lower position; a horizontal track pivotally mounted on said base for oscillation relative thereto about a generally-vertical axis; article-supporting means adapted for movement onto said horizontal track for dependently supporting heated articles as said base is alternately moved between its said elevated and lower positions to pass such articles along said vertical path into and out of said coating composition; first agitating means connected to said base-moving means and operable upon movement of said base to its said lower position for repetitively reciprocating said base-moving means and horizontal track upwardly and downwardly; second agitating means connected to said horizontal track and operable upon movement of said base to its said lower position for repetitively oscillating said horizontal track back and forth about said vertical axis as said horizontal track is being reciprocated to produce simultaneous oscillations and reciprocations of heated articles supported in said coating composition from said horizontal track; article-transporting means including a conveyor track having a portion terminating adjacent to one end of said horizontal track whenever said base is in its said elevated position and said horizontal track is halted in a predetermined position, and means adapted for moving said article-supporting means along one of said tracks and onto the other of said tracks whenever said horizontal track is halted in its said predetermined position; first means operable for halting said horizontal track in its said predetermined position when said base is in its said elevated position; and second means operable for retaining said article-supporting means on said horizontal track when said base is away from its said elevated position.

2. The apparatus of claim 1 wherein said article-supporting means include: a trolley adapted for travel along said tracks; and said second means include a clamping member adapted for movement between an inactive position and an active position, means on said clamping member adapted to retain said trolley from relative movement on said horizontal track whenever said clamping member is in its said active position, and means selectively operable for moving said clamping member between its said inactive and active positions.

3. The apparatus of claim 1 wherein said first means are operatively connected to said second agitating means and adapted for discontinuing operation of said second agitating means as said base is moved from its said lower position toward its said elevated position to halt said horizontal track in its said predetermined position.

4. The apparatus of claim 1 wherein said base-moving means include: a cable sheave secured above said elevated position of said base, piston means selectively operable between first and second positions, and a cable operatively carried on said cable sheave and connected between said base and said piston means for moving said base upon operation of said piston means.

5. The apparatus of claim 4 wherein said first agitating means include: crank means selectively operable for rotation about an axis transverse to said vertical path, and connecting means interconnecting said crank means to said piston means and adapted for imparting reciprocating motion to said piston means upon operation of said crank means.

References Cited

UNITED STATES PATENTS

| | | | |
|---|---|---|---|
| 682,412 | 9/1901 | Hunt | 118—425 |
| 1,204,120 | 11/1916 | Beausejour | 118—425 |
| 3,262,420 | 7/1966 | Bossi et al. | 118—57 |
| 2,824,029 | 2/1958 | Zinty. | |
| 2,844,489 | 7/1958 | Gemmer | 118—57 X |
| 3,431,887 | 3/1969 | Pettigrew et al. | 118—56 X |
| 3,446,266 | 5/1969 | Watts et al. | 118—56 X |

WALTER A. SCHEEL, Primary Examiner

J. P. McINTISH, Assistant Examiner